United States Patent
Brennan

(10) Patent No.: US 8,602,002 B2
(45) Date of Patent: Dec. 10, 2013

(54) SYSTEM AND METHOD FOR CONTROLLING ENGINE KNOCK USING ELECTRO-HYDRAULIC VALVE ACTUATION

(75) Inventor: Daniel G. Brennan, Brighton, MI (US)

(73) Assignee: GM Global Technology Operations LLC

( * ) Notice: Subject to any disclaimer, the term of this patent is extended or adjusted under 35 U.S.C. 154(b) by 724 days.

(21) Appl. No.: 12/850,930

(22) Filed: Aug. 5, 2010

(65) Prior Publication Data
US 2012/0031373 A1 Feb. 9, 2012

(51) Int. Cl.
*F01L 9/02* (2006.01)

(52) U.S. Cl.
USPC ............. 123/435; 123/90.12; 123/90.15; 123/90.11; 123/295

(58) Field of Classification Search
USPC ........... 123/90.11–90.13, 90.15–90.18, 295, 123/435; 701/111
See application file for complete search history.

(56) References Cited

U.S. PATENT DOCUMENTS

| | | |
|---|---|---|
| 1,703,858 A | 3/1928 | Banner |
| 3,157,166 A | 11/1964 | MacNeill |
| 4,009,695 A | 3/1977 | Ule |
| 4,044,652 A | 8/1977 | Lewis et al. |
| 4,459,946 A | 7/1984 | Burandt |
| 4,807,517 A | 2/1989 | Daeschner |
| 5,373,818 A | 12/1994 | Unger |
| 5,421,545 A | 6/1995 | Schexnayder |
| 5,546,222 A | 8/1996 | Plaessmann et al. |
| 5,572,961 A | 11/1996 | Schechter et al. |
| 5,638,781 A | 6/1997 | Sturman |
| 5,881,689 A | 3/1999 | Hochholzer |
| 6,109,284 A | 8/2000 | Johnson et al. |
| 6,112,711 A | 9/2000 | Shimizu et al. |
| 6,263,842 B1 | 7/2001 | DeOjeda et al. |
| 6,374,784 B1 | 4/2002 | Tischer et al. |
| 6,505,584 B2 | 1/2003 | Lou |
| 6,688,267 B1 | 2/2004 | Raghavan |
| 6,739,293 B2 | 5/2004 | Turner et al. |
| 6,848,422 B2 * | 2/2005 | Hashizume et al. ...... 123/406.29 |
| 6,886,510 B2 | 5/2005 | Sun et al. |
| 6,910,449 B2 * | 6/2005 | Strom et al. ............... 123/90.16 |
| 6,910,461 B2 * | 6/2005 | Tanei et al. ............... 123/406.29 |
| 7,441,538 B2 * | 10/2008 | Strom et al. .................... 123/305 |
| 7,793,637 B2 * | 9/2010 | Strom et al. .................... 123/304 |
| 8,037,850 B2 * | 10/2011 | Pursifull ............................ 123/3 |
| 2001/0023674 A1 | 9/2001 | Shimizu et al. |
| 2003/0015155 A1 | 1/2003 | Turner et al. |
| 2003/0131805 A1 * | 7/2003 | Yang ............................. 123/27 R |
| 2003/0172885 A1 | 9/2003 | Gaessler et al. |
| 2006/0243241 A1 * | 11/2006 | Kuo et al. ....................... 123/295 |
| 2008/0092834 A1 * | 4/2008 | Stein et al. .................... 123/90.15 |
| 2008/0275622 A1 * | 11/2008 | Strom et al. .................... 701/103 |
| 2010/0236523 A1 * | 9/2010 | Saruwatari et al. ............ 123/436 |
| 2011/0315101 A1 * | 12/2011 | Cleary et al. ................ 123/90.15 |

* cited by examiner

Primary Examiner — Erick Solis

(57) ABSTRACT

A control system for an engine includes a knock control module and a valve control module. The knock control module adjusts a period that one or more of an intake valve and an exhaust valve of a cylinder are open based on engine knock corresponding to the cylinder. The valve control module, based on the adjusted period, controls the one or more of the intake valve and the exhaust valve using one or more hydraulic actuators.

16 Claims, 4 Drawing Sheets

SYSTEM AND METHOD FOR CONTROLLING ENGINE KNOCK USING ELECTRO-HYDRAULIC VALVE ACTUATION

STATEMENT OF GOVERNMENT RIGHTS

This invention was produced pursuant to United States Government Program No. DE-FC26-05NT42415 with the Department of Energy (DoE). The U.S. Government has certain rights in this invention.

CROSS-REFERENCE TO RELATED APPLICATIONS

This application is related to U.S. Pat. No. 6,886,510 filed on Apr. 2, 2003. The disclosure of the above application is incorporated by reference in its entirety.

FIELD

The present disclosure relates to internal combustion engines and more particularly to a system and method for controlling engine knock using electro-hydraulic valve actuation (EHVA).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an inlet system that may be regulated by a throttle. The air in the intake manifold may be distributed to a plurality of cylinders through a plurality of intake valves, respectively, and combined with fuel to create an air/fuel (A/F) mixture. The A/F mixture may be combusted within the cylinders to drive pistons that rotatably turn a crankshaft generating drive torque. Exhaust gas resulting from combustion may be expelled from the cylinders through a plurality of exhaust valves, respectively, and into an exhaust manifold.

The intake and exhaust valves may be actuated by one or more camshafts. Alternatively, however, the intake and exhaust valves may be actuated using electrically controlled hydraulic actuators ("electro-hydraulic" control). The electro-hydraulic control of intake and exhaust valves of an engine may be referred to as electro-hydraulic valve actuation (EHVA). Therefore, an engine that incorporates EHVA may not include camshafts (i.e., a cam-less engine). For example, EHVA systems may selectively actuate (i.e., open) intake and exhaust valves by controlling hydraulic pressure (e.g., oil pressure).

SUMMARY

A control system for an engine includes a knock control module and a valve control module. The knock control module adjusts a period that one or more of an intake valve and an exhaust valve of a cylinder are open based on engine knock corresponding to the cylinder. The valve control module, based on the adjusted period, controls the one or more of the intake valve and the exhaust valve using one or more hydraulic actuators.

A method for controlling an engine includes adjusting a period that one or more of an intake valve and an exhaust valve of a cylinder are open based on engine knock corresponding to the cylinder, and based on the adjusted period, controlling the one or more of the intake valve and the exhaust valve using one or more hydraulic actuators.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
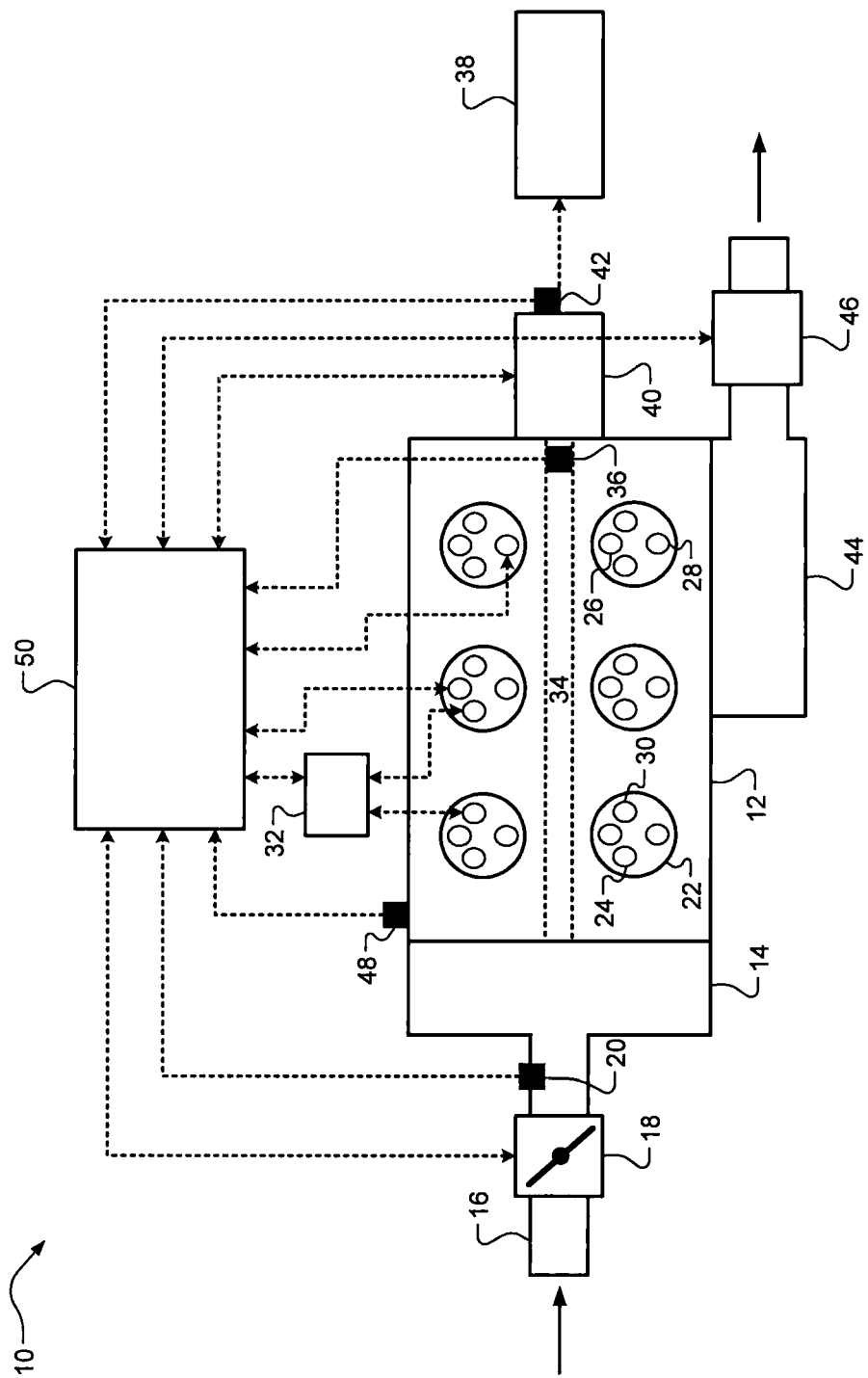
FIG. 1 is a functional block diagram of an exemplary engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Abnormal combustion of an air/fuel (A/F) mixture in an engine may cause engine knock (i.e., combustion noise, or vibration of the engine). Engine systems that control intake and exhaust valves using one or more camshafts may be limited in controlling engine knock. More specifically, camshaft engines may have a limited number of valve control profiles (e.g., two). Conventional control systems, therefore, may manage (i.e., limit) engine knock by adjusting spark advance. More specifically, conventional control systems may retard spark advance to decrease engine knock. Retarding spark advance, however, may result in decreased fuel economy.

Accordingly, a system and method are presented for improved control of engine knock using electro-hydraulic valve actuation (EHVA). The system and method may control a load of one or more cylinders when engine knock is detected. For example, the system and method may detect engine knock when a measurement by an engine knock sensor (i.e., engine knock intensity) is greater than a predetermined knock threshold. Decreasing engine knock by controlling the load of one or more cylinders allows for continued maximum brake torque (MBT) spark timing (i.e., no retarding of spark advance).

The system and method may decrease the load of the cylinder by decreasing a fresh air charge in the cylinder. For example, the system and method may decrease the fresh air charge by decreasing a period that the intake valve is open. Additionally or alternatively, the system and method may decrease the load of the cylinder by diluting the air in the cylinder. For example, the system and method may dilute the air in the cylinder by increasing a period that both the intake valve and the exhaust valve are open ("valve overlap"). Additionally, for example, the system and method may dilute the air in the cylinder by decreasing a period that the exhaust valve is open (i.e., close the exhaust valve earlier).

Referring now to FIG. 1, an engine system 10 includes an engine 12. For example, the engine 12 may include a spark ignition (SI) engine, a compression ignition (CI) engine (e.g., a diesel engine), or a homogeneous charge compression ignition (HCCI) engine. The engine 12, however, may also include a different type of engine and/or additional components, such as in a hybrid engine system (e.g., an electric motor, a battery system, a generator, etc.).

The engine 12 draws air into an intake manifold 14 through an intake system 16 that may be regulated by a throttle 18. For example, the throttle 18 may be electrically controlled (e.g., electronic throttle control, or ETC). A mass air flow (MAF) sensor 20 may measure a rate of airflow into the intake manifold 14. For example, the measurement of the MAF sensor 20 may indicate a load on the engine 12. The air in the intake manifold 14 may be distributed to a plurality of cylinders 22 through a plurality of intake valves 24, respectively. While six cylinders are shown, the engine 12 may include other numbers of cylinders.

The air may be combined with fuel from a plurality of fuel injectors 26 to create an air/fuel (A/F) mixture. For example, the fuel injectors 26 may inject the fuel via intake ports of the cylinders 22, respectively (e.g., port fuel injection) or directly into the cylinders 22, respectively (e.g., direct fuel injection). Additionally, for example, the fuel injectors 26 may inject the fuel at different times depending on the type of engine. The A/F mixture in the cylinders 22 may be compressed by pistons (not shown) and ignited by a plurality of spark plugs 28, respectively (e.g., SI engines or HCCI engines using spark assist). The air in the cylinders 22, however, may also be compressed by the pistons (not shown) and combusted by injecting the fuel into the pressurized air (e.g., CI engines, such as diesel engines).

The pistons (not shown) rotatably turn a crankshaft 34 generating drive torque. An engine speed sensor 36 may measure a rotational speed of the crankshaft 34 (e.g., in revolutions per minute, or RPM). The drive torque may be transferred to a driveline 38 (e.g., wheels) of the vehicle via a transmission 40. Additionally, for example, the transmission 40 may be coupled to the crankshaft 34 via a fluid coupling such as a torque converter. A transmission output shaft speed (TOSS) sensor 42 may measure a rotational speed of an output shaft of the transmission 40 (e.g., in RPM). For example, the measurement of the TOSS sensor 42 may indicate a speed of the vehicle.

Exhaust gas resulting from combustion may be expelled from the cylinders 22 through a plurality of exhaust valves 30, respectively, and into an exhaust manifold 44. Specifically, the intake and exhaust valves 24, 30 may be actuated by hydraulic actuators 32. In other words, the hydraulic actuators 32 may be electrically controlled to selectively actuate (i.e., lift) the intake and exhaust valves 24, 30. The exhaust gas in the exhaust manifold 44 may then be treated by an exhaust treatment system 46 before being released into the atmosphere. The exhaust gas, however, may also be recycled, such as into the intake manifold 14 via an exhaust gas recirculation (EGR) system or to power a turbocharger (not shown). The engine 12, however, may also include other types of forced induction (e.g., a supercharger).

An engine knock sensor 48 may measure engine knock. More specifically, the engine knock sensor 48 may measure vibration of the engine 12 (e.g., combustion noise). For example, the engine knock sensor 48 may be a digital knock sensor. Additionally, while a single engine knock sensor is shown, more than one engine knock sensor may be implemented. For example, the engine system 10 may include an engine knock sensor for each of the plurality of cylinders 22. In other words, a plurality of engine knock sensors may be implemented for measuring engine knock of the plurality of cylinders 22, respectively.

A control module 50 communicates with and controls various components of the engine system 10. Specifically, the control module 50 may receive signals from the throttle 18, the MAF sensor 20, the fuel injectors 26, the spark plugs 28, the hydraulic actuators 32, the engine speed sensor 36, the transmission 40, the TOSS sensor 42, the exhaust treatment system 46, and/or the engine knock sensor 48. The control module 50 may control the throttle 18 (e.g., ETC), the intake and exhaust valves 24, 30 (by controlling the hydraulic actuators 30), the fuel injectors 26, the spark plugs 28, the transmission 40, and/or the exhaust treatment system 46. Additionally, the control module 50 may communicate with and/or control other components (e.g., an EGR system, a turbocharger or supercharger, etc.). The control module 50 may also implement the system or method of the present disclosure.

Figure 2:
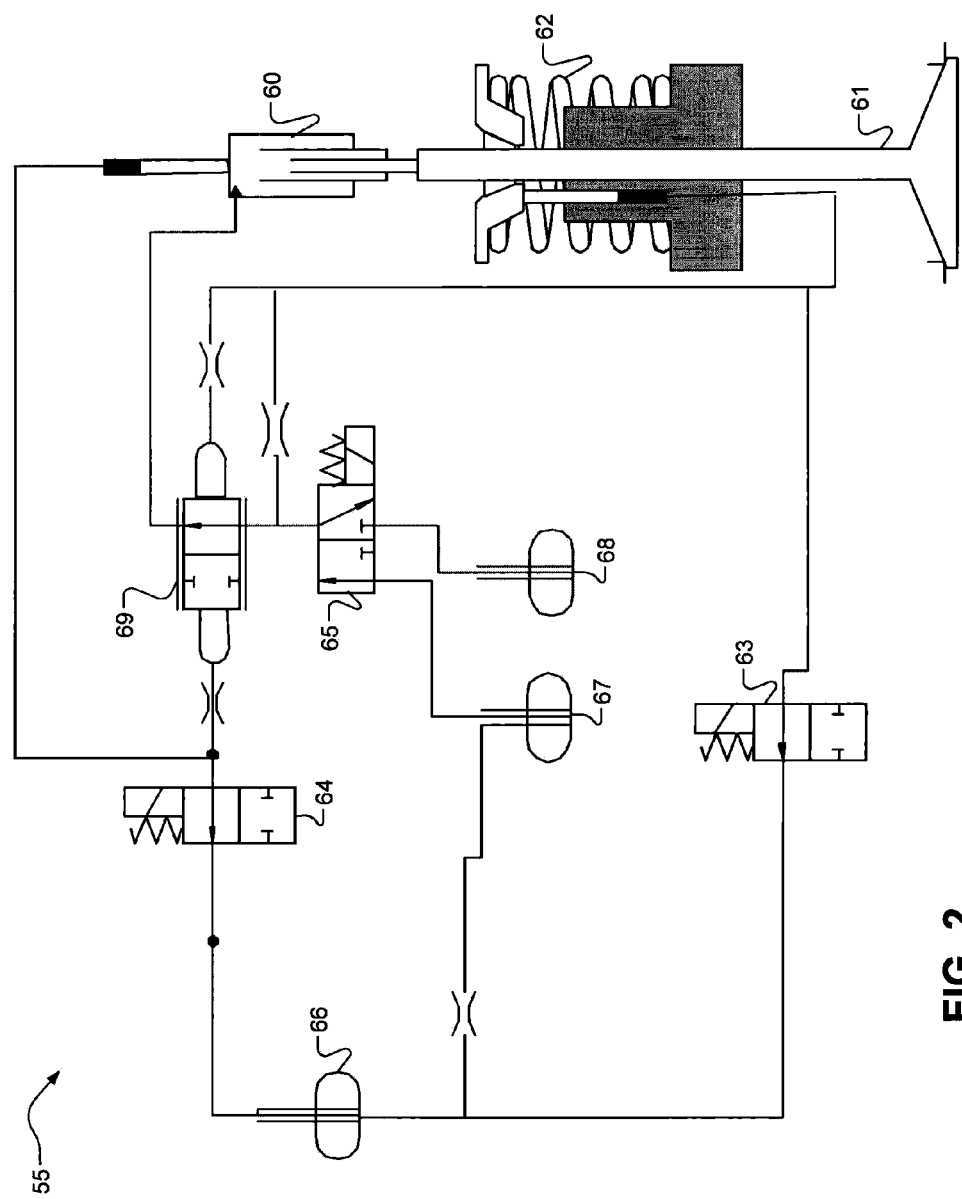
FIG. 2 is a schematic of an exemplary electro-hydraulic actuated valve according to the present disclosure.

Referring now to FIG. 2, an exemplary electro-hydraulic actuated valve 55 is shown. For example, the electro-hydraulic actuated valve 55 may include one of the hydraulic actuators 34 and one of the intake or exhaust valves 26, 32. The electro-hydraulic actuated valve 55 includes a hydraulic actuator 60, a valve 61, and a return spring 62. Specifically, the hydraulic actuator 60 is selectively energized by controlling hydraulic fluid pressure to open/close the valve 61. The valve 61 may be locked by trapping the hydraulic fluid (i.e., maintaining a constant hydraulic pressure). The return spring 62 may assist the valve 61 in returning to a closed position (i.e., when the actuator 60 is de-energized).

The electro-hydraulic actuated valve 55 also includes first, second, and third solenoids 63-65, respectively. For example, the first and second solenoids 63, 64 may include two-way solenoids and the third solenoid 65 may include a three-way solenoid. The first, second, and third solenoids are electrically controlled (e.g., via the control module 50) to control the hydraulic fluid pressure and thus control the hydraulic actuator 60 and the valve 61. Additionally or alternatively, the electro-hydraulic actuated valve 55 may include an internal feedback system (IFS) 69 for controlling the hydraulic fluid flow/pressure and thus controlling the hydraulic actuator 60 and the valve 61.

Specifically, the control module 50 may selectively actuate combinations of the first, second, and/or third solenoids 63-65 to allow hydraulic fluid flow (and thus hydraulic pressure) from first, second, and third hydraulic fluid rails 66-68, respectively. For example, the first hydraulic fluid rail 66 may include a low pressure rail (e.g., less than a first threshold), the third hydraulic fluid rail 68 may include a high pressure rail (e.g., greater than a second threshold), and the second hydraulic fluid rail may include a mid-pressure (i.e., base pressure) rail (e.g., between the first and second thresholds, or rather a pressure between the low and high pressure rails).

Figure 3:
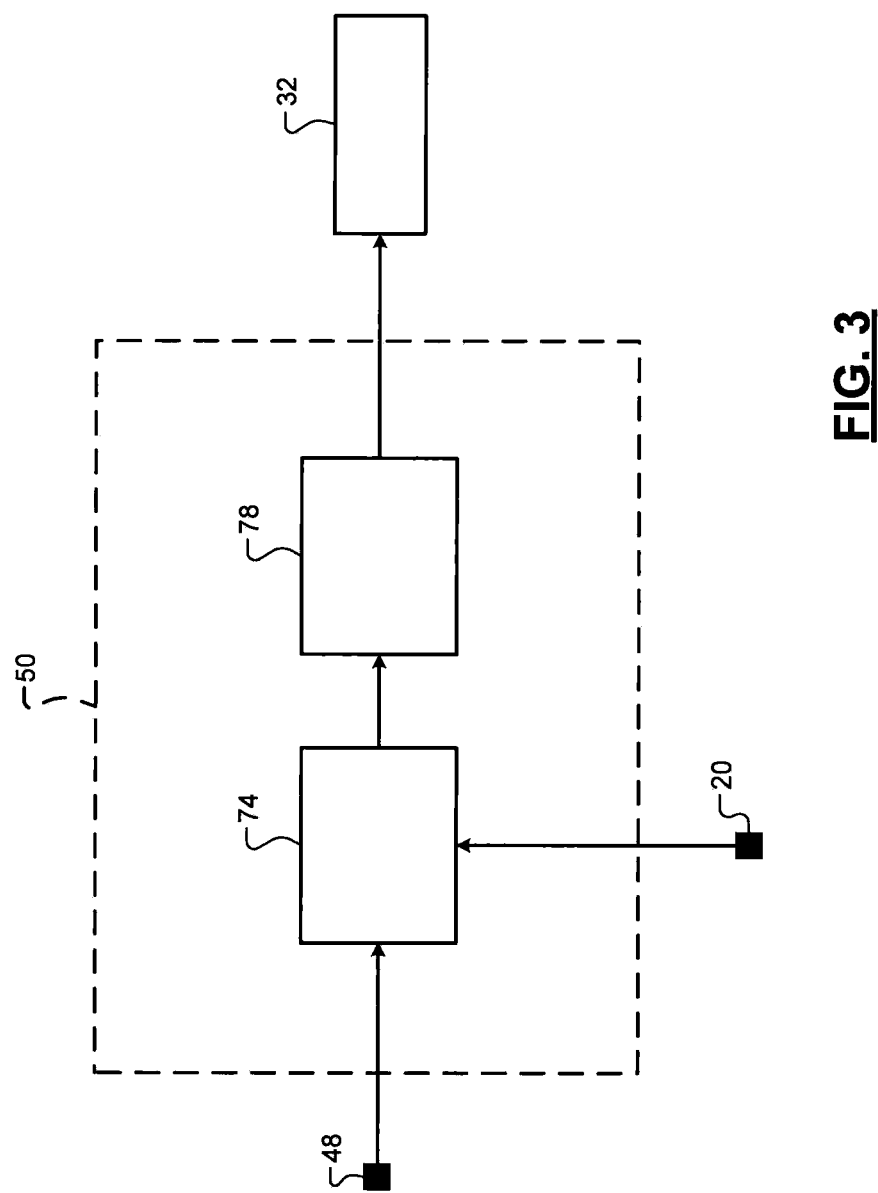
FIG. 3 is a functional block diagram of an exemplary control module according to the present disclosure.

Referring now to FIG. 3, the control module 50 is shown in more detail. The control module 50 may include a knock control module 74, and a valve control module 78. The control module 50 may also include memory (not shown) for storing determined and/or predetermined parameters. For example, the memory (not shown) may include non-volatile memory (NVM).

The knock control module 74 receives a signal from the engine knock sensor 48 (a "knock signal"). For example, the knock signal may indicate an intensity of the measured engine knock. The knock control module 74 may also receive signals indicating engine operating parameters. For example, the knock control module 74 may receive a signal from the MAF sensor 20 indicating a load on the engine. The knock control module 74, however, may receive other signals indicating other engine operating parameters. The engine operating parameters (e.g., MAF) may be used to determine desired timings of the intake and exhaust valves 24, 30 (i.e., periods that the intake and exhaust valves 24, 30 are open or closed).

The knock control module 74 may adjust a period that the intake and/or exhaust valves 24, 30 are open based on an intensity of the knock signal (the "measured engine knock"). In other words, when the measured engine knock increases, the knock control module 74 may decrease a load of the cylinder. Alternatively, however, the knock control module 74 may adjust the period that the intake and/or exhaust valves 24, 30 are open when the measured engine knock was greater than a predetermined engine knock threshold during a previous engine cycle (i.e., when engine knock was detected). Decreasing the load of the cylinder may include decreasing a quantity of fresh air in the cylinder and/or diluting the air in the cylinder (e.g., with exhaust gas).

Thus, for example, the knock control module 74 may decrease a period that the intake valve 24 is open. Additionally or alternatively, for example, the knock control module 74 may increase a period that both the intake and exhaust valves 24, 30 are open (i.e., increase valve overlap). Additionally or alternatively, for example, the knock control module 74 may decrease a period that the exhaust valve is open 30 (i.e., close the exhaust valve 30 earlier).

The valve control module 78 controls the intake and exhaust valves 24, 30 based on the adjusted period(s) from the knock control module 74. More specifically, the valve control module 78 may control the intake and exhaust valves 24, 30 according to the adjusted period(s) using the hydraulic actuators 32. For example, the valve control module 78 may generate a control signal for the hydraulic actuators 32, and the hydraulic actuators 32 may then actuate the intake and/or exhaust valves 24, 30 accordingly. Moreover, one intake valve 24, one exhaust valve 32, and one set (i.e., pair) of hydraulic actuators 32 are shown and discussed, the control module 50 may measure engine knock, adjust valve timing, and control valves of more than one of the plurality of cylinders 22.

Figure 4:
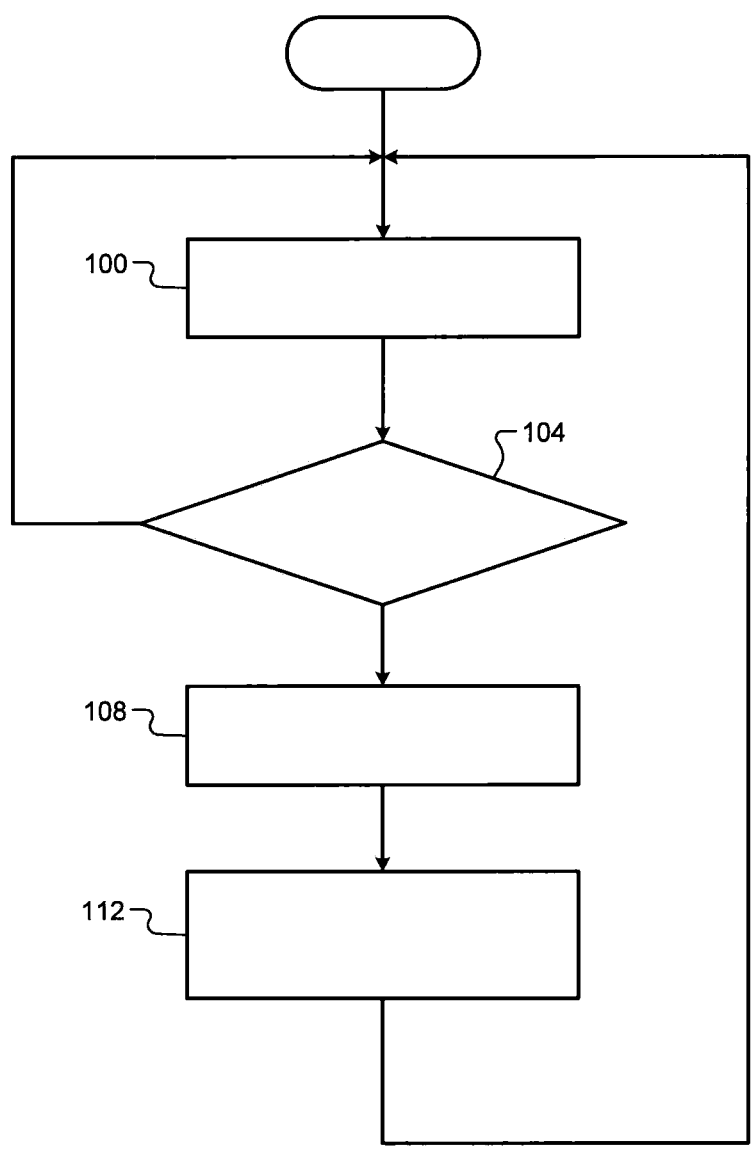
FIG. 4 is a flow diagram of an exemplary method for controlling engine knock using electro-hydraulic valve actuation (EHVA) according to the present disclosure.

Referring now to FIG. 4, a method for controlling engine knock using EHVA begins at 100. At 100, the control module 50 may measure engine knock (e.g., via the knock signal from the engine knock sensor 48). At 104, the control module 50 may determine whether the measured engine knock is greater than a predetermined engine knock threshold. If true, control may proceed to 108. If false, control may return to 100.

At 108, the control module 50 may adjust the period(s) that the intake and/or exhaust valves 24, 30 are open based on the measured engine knock. At 112, the control module 50 may control the intake and exhaust valves 24, 30 based on the adjusted period(s) using the hydraulic actuators 32. Control may then return to 100.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, comprising:
a knock control module that adjusts a period that one or more of an intake valve and an exhaust valve of a cylinder are open based on engine knock corresponding to the cylinder; and
a valve control module that, based on the adjusted period, controls the one or more of the intake valve and the exhaust valve using one or more electro-hydraulic actuators,
wherein the valve control module controls the one or more of the intake valve and the exhaust valve without a camshaft,
wherein each of the one or more electro-hydraulic actuators includes:
a hydraulic actuator;
a valve;
a return spring connected between the hydraulic actuator and the valve;
an internal feedback system in fluid communication with the hydraulic actuator;
a three-way solenoid in fluid communication with the internal feedback system, a first pressure rail, the valve, and a second pressure rail;
a first two-way solenoid in fluid communication with the internal feedback system, the hydraulic actuator and a third pressure rail; and
a second two-way solenoid in fluid communication with the valve and the third pressure rail, and
wherein the second pressure rail supplies a higher pressure than the first pressure rail and wherein the third pressure rail supplies a lower pressure than the first pressure rail.

2. The control system of claim 1, wherein the knock control module decreases a period that the intake valve is open.

3. The control system of claim 1, wherein the knock control module increases a period that both the intake valve and exhaust valves are open.

4. The control system of claim 1, wherein the knock control module decreases a period that the exhaust valve is open.

5. The control system of claim 4, wherein the knock control module advances the period that the exhaust valve is open such that the exhaust valve closes earlier.

6. The control system of claim 1, wherein the knock control module adjusts the period that the one or more of the intake valve and the exhaust valve of the cylinder are open when the engine knock corresponding to the cylinder is greater than a predetermined knock threshold.

7. The control system of claim 1, wherein maximum brake torque (MBT) spark timing is commanded.

8. The control system of claim 1, wherein the engine is one of a spark ignition (SI) engine and a homogeneous charge compression ignition (HCCI) engine.

9. A method for controlling an engine, comprising:
adjusting a period that one or more of an intake valve and an exhaust valve of a cylinder are open based on engine knock corresponding to the cylinder; and
based on the adjusted period, controlling the one or more of the intake valve and the exhaust valve using one or more electro-hydraulic actuators, wherein the one or more of the intake valve and the exhaust valve are controlled without a camshaft,
wherein the one or more electro-hydraulic actuators include:
a hydraulic actuator;
a valve;
a return spring connected between the hydraulic actuator and the valve;
an internal feedback system in fluid communication with the hydraulic actuator;
a three-way solenoid in fluid communication with the internal feedback system, a first pressure rail, the valve, and a second pressure rail;
a first two-way solenoid in fluid communication with the internal feedback system, the hydraulic actuator and a third pressure rail; and
a second two-way solenoid in fluid communication with the valve and the third pressure rail, and
wherein the second pressure rail supplies a higher pressure than the first pressure rail and wherein the third pressure rail supplies a lower pressure than the first pressure rail.

10. The method of claim 9, wherein adjusting the period that one or more of the intake valve and the exhaust valve of the cylinder are open includes decreasing a period that the intake valve is open.

11. The method of claim 9, wherein adjusting the period that one or more of the intake valve and the exhaust valve of the cylinder are open includes increasing a period that both the intake valve and exhaust valves are open.

12. The method of claim 9, wherein adjusting the period that one or more of the intake valve and the exhaust valve of the cylinder are open includes decreasing a period that the exhaust valve is open.

13. The method of claim 12, wherein decreasing the period that the exhaust valve is open includes advancing the period that the exhaust valve is open such that the exhaust valve closes earlier.

14. The method of claim 9, further comprising adjusting the period that the one or more of the intake valve and the exhaust valve of the cylinder are open when the engine knock corresponding to the cylinder is greater than a predetermined knock threshold.

15. The method of claim 9, further comprising commanding maximum brake torque (MBT) spark timing.

16. The method of claim 9, wherein the engine is one of a spark ignition (SI) engine and a homogeneous charge compression ignition (HCCI) engine.

* * * * *